April 23, 1940. W. M. POHL ET AL Re. 21,434
MACHINE TOOL TRANSMISSION AND CONTROL
Original Filed Jan. 27, 1933 5 Sheets-Sheet 1
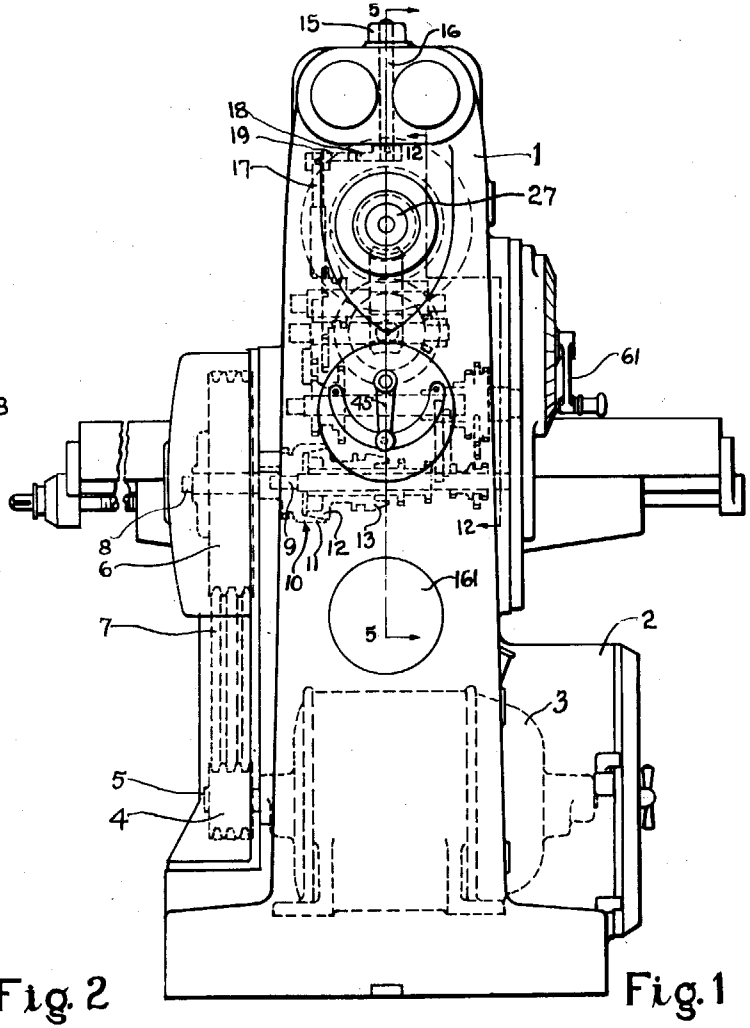
Fig. 1
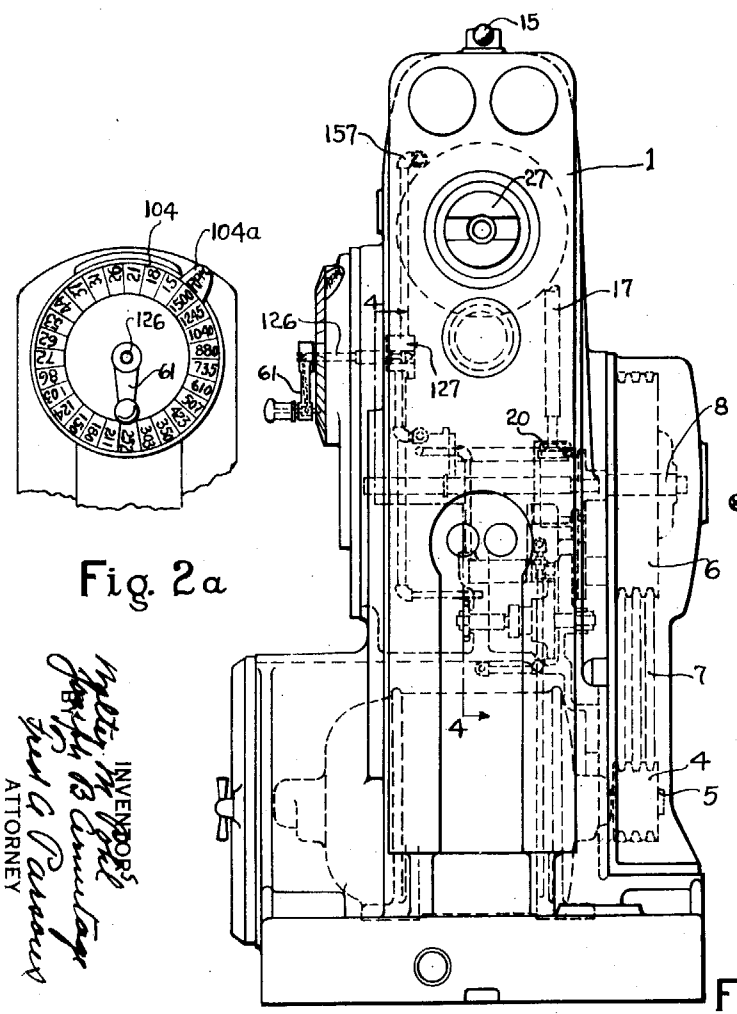
Fig. 2
Fig. 2a
INVENTORS
Walter M. Pohl
Joseph B. Armitage
BY
Fred A. Parsons
ATTORNEY April 23, 1940. W. M. POHL ET AL Re. 21,434
MACHINE TOOL TRANSMISSION AND CONTROL
Original Filed Jan. 27, 1933 5 Sheets-Sheet 2
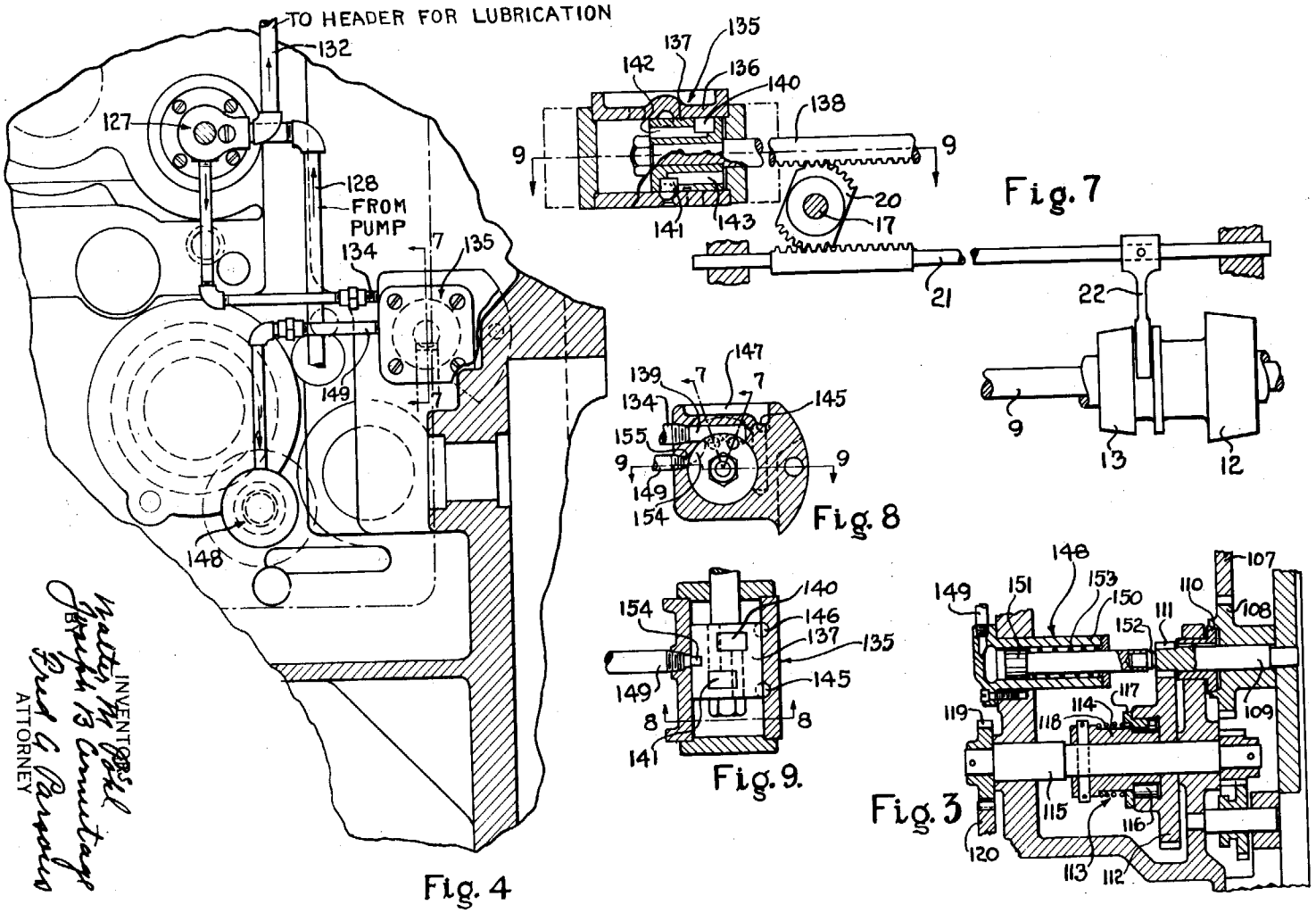
INVENTORS
Walter M. Pohl
Joseph B. Armitage
BY
Fred G. Parsons
ATTORNEY April 23, 1940. W. M. POHL ET AL Re. 21,434

MACHINE TOOL TRANSMISSION AND CONTROL

Original Filed Jan. 27, 1933 5 Sheets-Sheet 3

INVENTORS
Walter M. Pohl
Joseph B. Armitage
BY
Fred A. Parsons
ATTORNEY

MACHINE TOOL TRANSMISSION AND CONTROL

Original Filed Jan. 27, 1933 5 Sheets-Sheet 4

INVENTORS
Walter M. Pohl
Joseph B. Armutage
BY
Fred A. Parsons
ATTORNEY

MACHINE TOOL TRANSMISSION AND CONTROL

Original Filed Jan. 27, 1933 5 Sheets-Sheet 5

INVENTORS
Walter M. Pohl
Joseph B. Armitage
BY Fred A. Parsons
ATTORNEY

Reissued Apr. 23, 1940

Re. 21,434

UNITED STATES PATENT OFFICE 21,434

MACHINE TOOL TRANSMISSION AND CONTROL

Walter M. Pohl, Washington, D. C., and Joseph B. Armitage, Wauwatosa, Wis., assignors to Kearney & Trecker Corporation, West Allis, Wis., a corporation Original No. 2,110,173, dated March 8, 1938, Serial No. 653,872, January 27, 1933. Renewed July 30, 1936. Application for reissue May 27, 1939, Serial No. 276,086

49 Claims. (Cl. 90—18)

This invention relates generally to transmission and control mechanism for driving machine tool spindles, and more particularly to the tool spindle drive of a milling machine.

A primary object of the invention is to provide improved rate changing means covering a wide range of rates between the highest and lowest available speeds, and in which the different speeds form a series having relatively small increments of rate change, and to provide control mechanism for the transmission having a single lever or shifter for effecting all of the rate changes and operable for effecting the changes in their numerical sequence or order.

Another object is to provide a rate changer, particularly for spindle drives where there is involved the use of relatively heavy shiftable gearing, with control mechanism such that the gearing cannot be shifted in a manner which might cause breakage or damage to the gears.

Another object is to provide improved mechanism for facilitating the shifting of speed changing gearing.

Another object is to provide in a machine tool safety features preventing damage or breaking of the rate change elements or gears, which function automatically and without the need for any attention or operation on the part of the operator other than that normally required for effecting a desired change of rate.

Another object relates to providing a rate changer, such as has been previously referred to, with a safety device or interlock insuring that the rate changer and the mechanism driven therethrough is disconnected from the normal drive train at the time that a desired rate change is effected.

Another object is to provide mechanism for a rate changer of the type involving shiftable gearing or similar rate change elements which will insure that the rate changer is disconnected from its normal driving mechanism during the interval in which a desired change of rate is to be effected, and connected instead to a driving mechanism which will rotate the rate change elements relatively slowly, in order to avoid the disadvantages arising from the intermeshing of elements at high speed, while still insuring that the elements are in motion in order that they may be more easily shifted and that the shifting thereof may not be blocked.

Other objects relate to the use of improved hydraulically operated mechanism, both to shift out of engagement the main clutch of a spindle or similar driving train during the interval when a rate change is to be effected, and also to similarly shift into engagement an auxiliary driving connection for rotating the spindle and the rate changer thereof slowly during said interval.

Further objects are generally to improve and simplify the construction and operation of transmission mechanism, particularly for machine tool spindles and more particularly for the spindles of milling machines, and still further objects will be apparent from the specification and claims.

The invention consists in the construction, arrangement, and combination of parts as herein illustrated, described, and claimed, and in such modifications thereof as are equivalent to the structure claimed.

Fig. 1 is a view in rear elevation of a knee and column type of milling machine which incorporates the invention.

Fig. 2 is a view in front elevation of the column of the machine, the knee, table, and saddle thereof not being shown in this view.

Fig. 2*a* is a partial view of the column in left side elevation showing the speed indicating device.

Figures 5, 6:
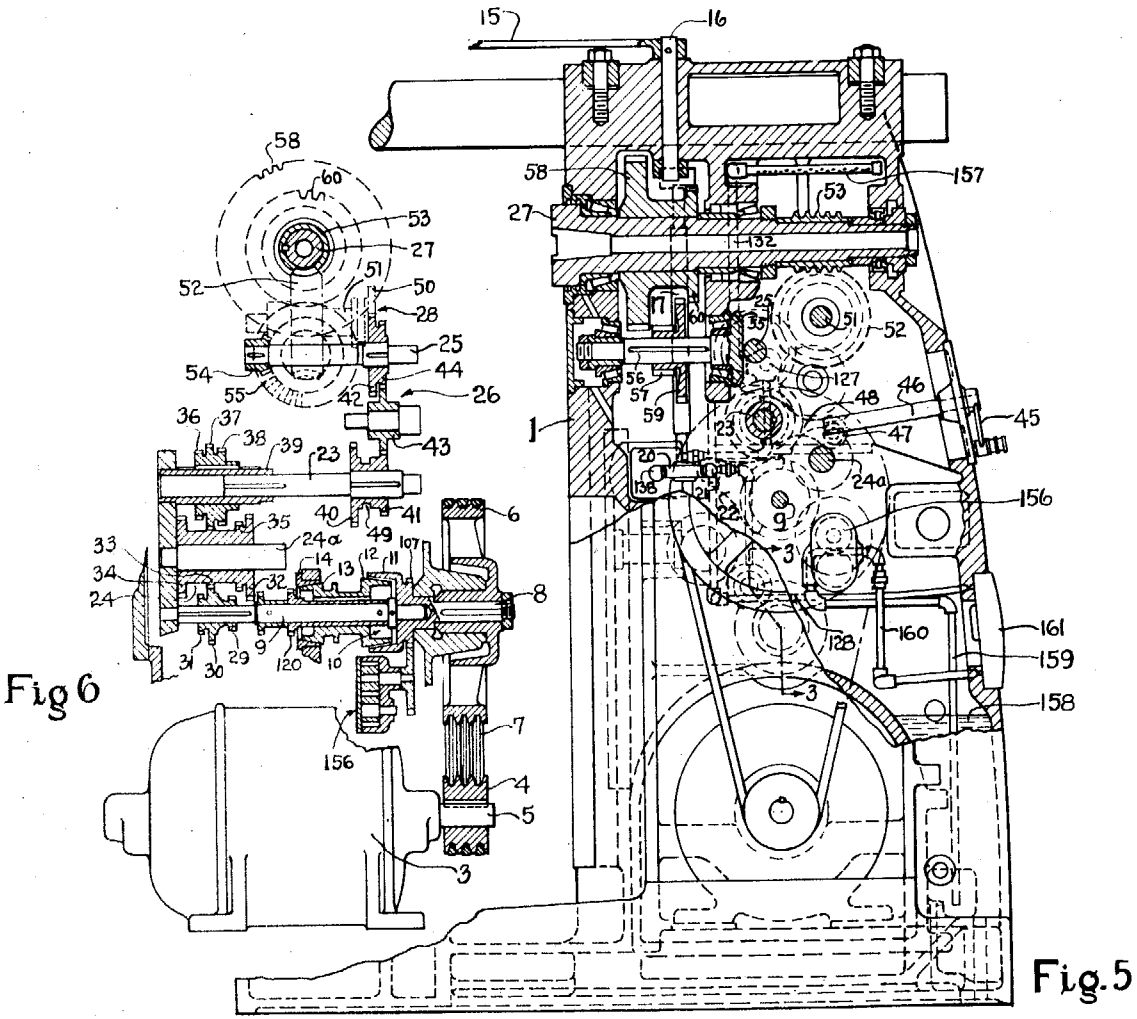

Fig. 3 is a partial view in section taken along line 3—3 of Fig. 5, enlarged.

Fig. 4 is a partial view in section taken along line 4—4 of Fig. 2, enlarged.

Fig. 5 is a view in section taken along line 5—5 of Fig. 1, the knee, saddle, and table of the machine not being shown.

Fig. 6 is a diagrammatic view showing a development of the spindle driving train.

Fig. 7 is a detail view in section taken along line 7—7 of Fig. 4.

Fig. 8 is a view in cross section taken along line 8—8 of Fig. 9.

Fig. 9 is a view in longitudinal section taken along lines 9—9 of Figs. 7 and 8.

Figures 10, 11:
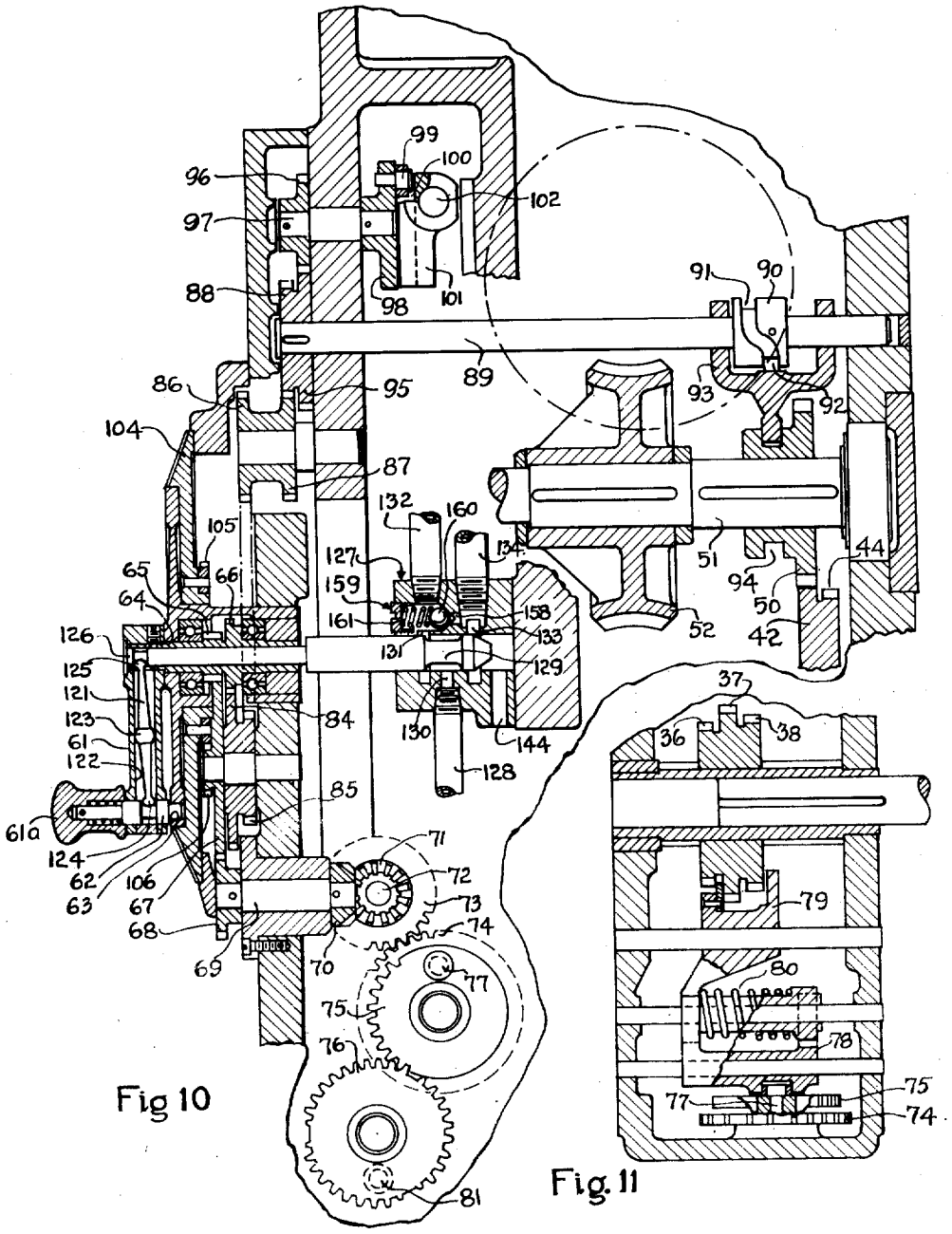

Fig. 10 is an enlarged semi-diagrammatic view of certain of the rate change mechanism shown in Fig. 6 and some of the associated elements.

Fig. 11 is an enlarged view in section showing some of the details of a gear shifting device incorporated in the machine.

Figure 12:
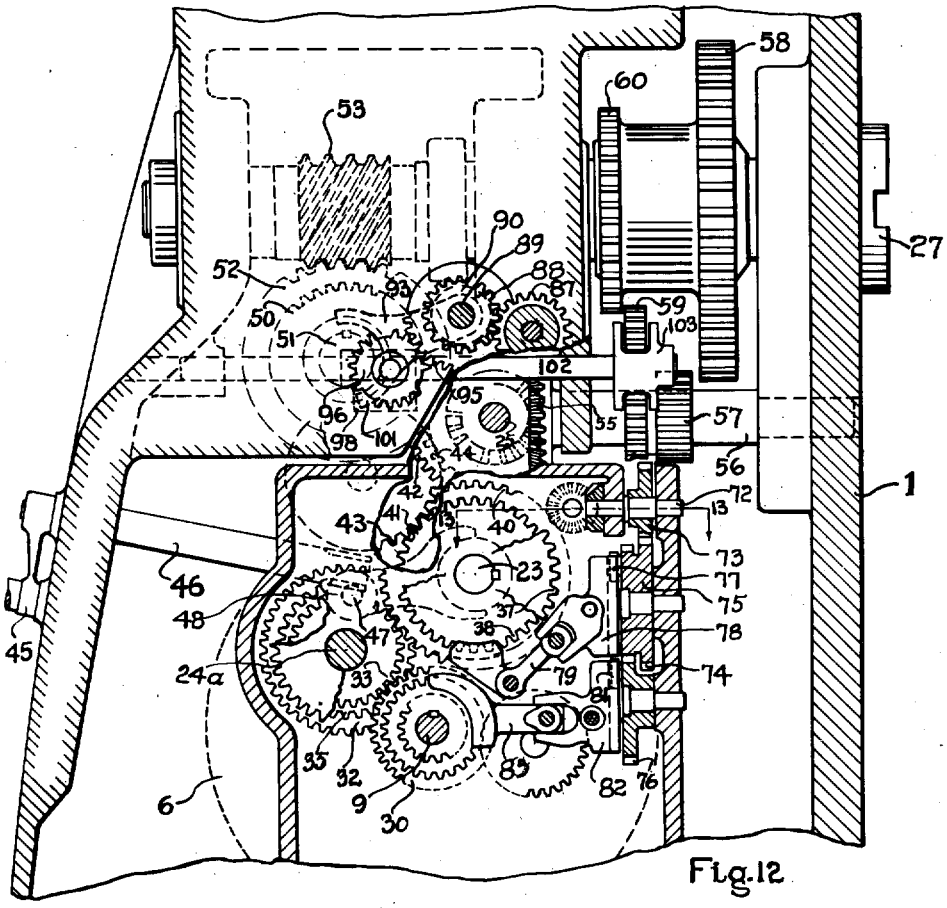

Fig. 12 is an enlarged view in section with parts broken away taken along line 12—12 of Fig. 1.

Figure 13:
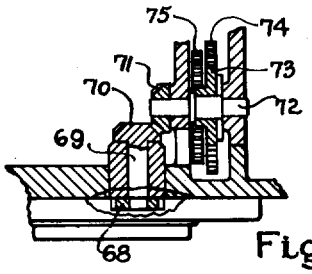

Fig. 13 is a partial view in section taken along line 13—13 of Fig. 12.

The milling machine herein illustrated includes a hollow column 1, within which is a lower chamber 2 housing a prime mover or driving motor 3. A pulley 4 mounted on the shaft 5 of a substantially constant speed motor 3 drives a pulley 6 by the means of multiple belts 7. Pulley 6 is fixed with a shaft 8. A shaft 9 is coaxial with shaft 8 and may be connected or disconnected therefrom by the means of a main clutch generally denoted by the numeral 10, there being a clutch member 11 fixed on shaft 8 and a second clutch member 12 slidably keyed on shaft 9 which may be shifted into or out of engagement with the clutch member 11 for this purpose. A brake member 13 fixed with clutch member 12 operates to engage complementary brake or friction surfaces between the brake member 13 and a member 14 fixed with the column when the clutch disengaging movement of member 12 is continued, as more fully shown in Fig. 6.

The clutch 12 and brake 13 may be manually operated by the means of a controller or lever 15, Figs. 1, 2, 5, fixed with a shaft 16 which operates a shaft 17, Figs. 1, 2, through gear segments 18, 19. A gear segment 20, Figs. 2, 5, and 7, fixed at the lower end of shaft 17, engages rack teeth of a rod 21 slidably supported and carrying a fork 22 engaging a suitable annular groove in the shiftable clutch member 12.

As best shown in Fig. 6, shaft 9 drives a shaft 23 through a first or primary rate changer generally designated by the numeral 24 and constituting a part of a variable speed transmission mechanism for driving the milling machine spindle. The shaft 23 drives a shaft 25 in either direction through a reverser generally designated by the numeral 26. Shaft 25 drives spindle 27 through a second or supplementary rate changer generally designated by the numeral 28, the rate changers being serially arranged.

The first or primary rate changer 24 is constructed as follows: Gears 29, 30, 31 are slidably keyed with the shaft 9 and fixed together for unitary axial movement for engagement one at a time respectively with gears 32, 33, 34 which are fixed together and rotatably supported on a shaft 24a. Another gear 35 is also fixed with shaft 24a and gears 36, 37, 38, slidably keyed on a sleeve 39 in driving relation to the shaft 23, are adapted for engagement one at a time with the gears 34, 33, and 35 respectively complementary thereto. The arrangement is such that the various positions of the shiftable gears provide nine changes of rate between the driving shaft 9 and the shaft 23, and since the difference in gear diameters is relatively small, the rate changes effected form a series having nine relatively small increments.

The reverser 26 is constructed and operated as follows: Slidably keyed on shaft 23 is a unitary pair of gears 40, 41. In the one position of axial adjustment of the gear pair, the gear 40 engages a gear 42 fixed on shaft 25. In another position of axial adjustment the gear 41 engages an idler 43 which drives a gear 44 fixed on shaft 25. The gear pair 40, 41 may be shifted to the one or the other position by the means of a hand lever 45, Figs. 5 and 12, fixed on a shaft 46 having teeth engaging a rack bar 47 upon which is fixed a fork member 48 engaging a suitable annular groove 49 in the hub of the gear pair 40, 41.

The second or supplementary rate changer 28, Figs. 5, 6, 10, 12, is constructed as follows: A gear 50 is slidably keyed to a shaft 51 and is shiftable into and out of engagement with the gear 42 whereby to connect or to disconnect a high speed train consisting of gears 42, 50, shaft 51, a helical or worm gear 52 fixed on shaft 51, and a complementary helical pinion or worm 53 fixed on the spindle 27. Two other power trains are also driven from shaft 25 through bevel gears 54, 55 and a shaft 56. The two trains just referred to consist respectively of the gear 57 slidably splined with shaft 56 and engageable with a gear 58 fixed with spindle 27 to form a low speed train; and a gear 59 slidably splined on shaft 56 and engageable with a gear 60 fixed with spindle 27 to form an intermediate speed train. The gears 57, 59 are fixed together for unitary movement and arranged to be engageable one at a time. The combined effect of the mechanism described is to give three separate power trains of different rate effect from the shaft 25 to the spindle which, in combination with the first rate changer, provides 27 changes of spindle speed. The differences in diameter of the gears fixed on the spindle 27 are such that the increments of rate changes effected by the second rate changer 28 are each larger than the total range of rate changes effected by the first rate changer.

The speed selector mechanism for the shifting of the rate changer elements, although it differs somewhat in structure, is similar in its action to that disclosed in Patent No. 1,817,036, issued August 4, 1931. The structure of the mechanism herein disclosed is as follows:

The first and second rate changers are each operated or adjusted by means of a controller or lever 61, Figs. 2 and 10, which carries a spring pressed plunger 62 normally engaging a bore or socket 63 whereby to lock the rate changers in the various positions of adjustment. Plunger 62 may be withdrawn to unlock the rate changers in initiating an adjustment thereof, by a handle 61a. The lever 61 is fixed on a sleeve or hollow shaft 64 upon which are fixed gears 65, 66, Fig. 10. Gear 65 drives a shifter train consisting of the gear 65, a gear 67 engaging therewith, a gear 68 fixed on shaft 69, Figs. 10, 12, 13, bevel gears 70, 71, shaft 72, gear 73 fixed on shaft 72, a gear 74 meshing with gear 73, and a pair of intermittent gears 75, 76, the gear 75 being fixed with gear 74 and driving the gear 76 in a manner such that after each one-third revolution of the gears together, the gear 76 remains stationary while gear 75 completes an additional movement of two-thirds revolution. Thus the gear 74 completes three revolutions to one revolution of gear 76. Fixed with gear 75 is a pin or shoe 77, Figs. 10, 11, 12, forming an eccentric engaging a suitable slot in a shiftable member 78 which shifts a fork member 79, Figs. 11, 12, through the intermediate agency of a spring 80, the fork 79 engaging the sides of gears 37, 38 for movement thereof, the action being such that each half revolution of gear 74 shifts the gears 36, 37, 38 from the one to the other end of their movement through the intermediate position, and the next suceeding half revolution shifts them back again. Similarly the gear 76 carries a pin or shoe 81, Fig. 10, engaging a slot in a member 82, Fig. 12, which shifts a fork member 83 engaging the sides of the gear 30, there being a spring element, not shown, in the train to fork 83, similar to spring 80 in the train to fork member 79.

The intermittent gears 75, 76 and the eccentric operative therefrom are of such form and relationship that the gears 36, 37, 38 are shifted through each of their positions while the gears 29, 30, 31 are held in each of the positions thereof whereby a complete shift of the gears 29, 30, 31 to each of the positions thereof is productive of the entire series of nine speeds of the first rate changer.

The lever 61, in addition to the shifter trains for the primary rate changer just described, also operates shifter trains to the secondary rate changer, as follows: Fixed on hollow shaft 64, Fig. 10, is a gear 66 engaging a gear 84 fixed with a gear 85 which meshes with a gear 86, fixed with a gear 87 engaging a gear 88 fixed on a shaft 89. Shaft 89 has fixed thereon a cam 90 having a groove 91 engaging a pin or follower 92 fixed in a fork or shoe member 93 which engages an annular groove 94 in the hub of the gear 50. By the described shifter train a shifting movement of lever 61 moves gear 50 into and out of engagement with the gear 42, thus engaging or disengaging the high speed train of the second rate changer. Fixed with gear 88 on shaft 89 is an intermittent gear 95 engaging an intermittent gear 96 fixed on a shaft 97 upon which is also fixed a member 98 carrying a pin or shoe 99 forming an eccentric engaging a suitable slot 100 in a member 101 fixed on a shiftable rod 102, Figs. 10, 12, upon which is also fixed a fork member 103 engaging the sides of the gear 59. The intermittent gears 95, 96, the eccentric member 98, and cam 90 are of such form and relationship that gears 50, 57, 59 are shifted into engagement one at a time whereby the low, intermediate and high speed trains of the second rate changer are operative one at a time and never simultaneously as to any two thereof.

The shifter trains operative from gears 65 and 66, respectively for the first and second rate changers are of such form and relationship that the first rate changer is shifted through its entire series of nine speeds while the second rate changer is retained in each of the three positions respectively productive of its high, intermediate and low rates, whereby a complete shift of the second rate changer is productive of each of the twenty-seven speeds of which the spindle drive train is capable. Also the arrangement of the shifter trains is such that in each direction of rotation of lever 61 the various speeds are arrived at in numerical order, and such that one revolution of the lever is productive of a change, from one speed to the next speed of the series, either higher or lower according to the direction of lever movement.

A speed indicating device is associated with the shifting mechanism as follows: A chart or dial 104, Figs. 2a, 10, is rotatably supported for movement adjacent to an indicator or pointer 104a, the chart being geared for movement in accordance with the shifting movement of lever 61, there being a ring gear 105 fixed with the dial and engaging a gear 106 fixed for rotation with the gear 67 of one of the shifter trains previously described. The dial 104 has a series of indicia corresponding to the value and order of the rates obtained by the operation of lever 61 and the relation is such that one revolution of lever 61, which, as explained previously, effects a change from one speed to the next, likewise moves the indicating device to a corresponding one of the various indicia thereon, whereby in any position of the rate changers the indicating device correctly shows the speed available at the time.

The mechanism previously described is the normal spindle operating train. To facilitate gear shifting, there is also provided an auxiliary or branch train for relatively slow rotation of the gearing of the rate change devices as follows: Fixed with the clutch member 11 is a gear 107 engaging a gear 108, Fig. 3, which is supported on a shaft 109 but normally free therefrom. A clutch member 110 fixed on shaft 109 may be shifted to engage complementary clutch surfaces on the member 110 and gear 108 by shifting the shaft 109 endwise, which is accomplished by mechanism to be later described, and when so shifted, the shaft will be driven from gear 108. The friction surfaces are such that unless the shaft is forcibly shifted, they will disengage, whereby the shaft is normally free of the gear. Fixed on shaft 109 is a gear 111 engaging with a gear 112, Fig. 3, the hub of which provides an outer member for a one-way or overrunning clutch device generally denoted by the numeral 113, Fig. 3. The overrunning device 113 includes an inner or cam member 114 fixed on a shaft 115, rollers or similar elements 116 interposed between suitable cam surfaces of the member 114 and the bore of the hub of gear 112 and a cage member 117 for the rollers 116 normally pressed by a spring 118 to rotate relative to the member 114 in a direction to cause the rollers 116 to ride upon suitable cam surfaces of the member 114 in a direction to cause the rollers 116 to wedge between the cam surfaces and the bore in the hub of the gear. The shaft 115 has fixed thereon a gear 119 engaging with a gear 120 fixed on the shaft 9. The arrangement is such that the shaft 115 may drive shaft 9 or be driven therefrom, but if driven from the shaft 9 the overrunning clutch device 113 will disengage whereby the gear 112 will not be driven from the shaft. By the mechanism described the gear 108 may drive shaft 9 in the event that the clutch member 110 is engaged and in the further event that the shaft 9 is not rotating at a speed sufficiently high to move the shaft 115 faster than it would be rotated by the gear 112. The train just described is relatively a very slow speed train and since the normal driving mechanism for shaft 9 is of relatively high speed, the shaft 9 by reason of the overrunning device can never drive the gear 112, although the gear 112 may drive the shaft 9. At the time the clutch member 110 is shifted into engagement, the main clutch 10 will be disengaged by mechanism later disclosed, but even if this did not occur, no damage would result for the reason that the overrunning device would prevent gear 112 from being simultaneously driven through two trains of different speed.

Mechanism to simultaneously shift the main clutch 12 and brake member 13 to a central or neutral position and to shift the clutch member 110 of the slow speed train, just described, to its engaged position for rotation of the spindle train at relatively very slow speed, operates automatically whenever plunger 62, Fig. 10, is withdrawn to permit a change in the spindle rate, the mechanism being as follows: A lever 121, Fig. 10 is movable within a suitable bore 122 in the arm of lever 61, being pivoted on a spherical portion 123 fitted within the bore and has a rounded outer end portion 124 engaging an annular groove in the plunger 62 and a rounded inner end portion 125 engaging a suitable annular groove in a rod or plunger 126 fitted within the bore of the hollow sleeve or shaft 64. The rod 126 extends into a valve generally indicated by numeral 127 supplied with fluid from any suitable source, such as a pipe 128. An annular groove 129 in the rod 126 normally provides free communication between a port 130 which communicates with the supply pipe 128 and an outlet port 131 which communicates with an outlet pipe 132. But in the event that the plunger 62 is withdrawn to initiate a shifting movement for effecting a change in spindle rate, the lever 121 moves the rod 126 to close communication from port 130 to the port 131 and to open communication with a port 133 communicating with a pipe 134 which is used to supply fluid to the clutch shifting mechanism previously mentioned.

Fluid for shifting the main clutch 10 is supplied from the pipe or channel 134 to a device generally denoted by the numeral 135, Figs. 4, 7, 8, 9, including a cylinder 136, a piston 137, and a piston rod 138, having rack teeth engaging the gear segment 20 at the side opposite to that engaged by the shifter rod 21 which carries the fork 22 engaging the shiftable clutch member 12. The piston 137 has a central position in which a port 139, Fig. 8, supplied from the pipe 134 is in communication with each of two recesses 140, 141 respectively engaging with the channels 142, 143 leading to the opposite ends of the cylinder. If the piston is displaced from the central position, the one or the other of the recesses passes out of communication with the supply port 139, but since the port is supplied with pressure fluid from the valve 127 only when the plunger 62 is shifted for a change of speed, there is no tendency to move the piston 137 back to its central position unless the plunger 62 has been so moved. The piston 137 may, therefore, normally freely take up any of the positions brought about by the movement of the segment 20 to engage clutch 12 or brake 13 from hand lever 15. During hand movement the piston displaces fluid in the cylinder (which might otherwise retard or prevent the movement of the piston) since in either direction of piston movement, the fluid may pass out of the cylinder through the one or the other of channels 142, or 143, and the one or the other of recesses 140 or 141 and into the port 139 and channel 134 from which it may escape through the bore of the valve 127 and out through a vent hole 144, Fig. 10, the end of the rod 126 being reduced to permit communication from the channel 134 through the port 133 and the bore of the valve when the rod 126 is in the position normally occupied at the time that the plunger 62 is seated, and excepting only when the plunger 62 has been withdrawn to effect a rate change. Thus at any time when the clutch 12 or brake 13 are intended to be operated by hand, that is to say, at any time except when a rate change is to be effected by the lever 61, the piston 137 may be freely moved from the segment 20. To further prevent any drag on the manual movement of the piston 137 in either direction of its movement from the segment 20, vents 145 and 146 are provided. These vents are so positioned with respect to the length of the piston that neither is open when the piston is in central position thereby preventing the escape of fluid pressure from the port 139, but if the piston is being displaced from the central position by the movement of the segment 20 from hand lever 15, the one or the other vent immediately opens to avoid a vacuum being set up and to admit fluid from a reservoir 147 with which each of the vents communicates.

For controlling the auxiliary or slow speed train, a device generally indicated by the numeral 148, Figs. 3 and 4, is used to shift the clutch 110 into and out of engagement in accordance with the fluid pressure in the channel 134, that is to say, to shift the clutch 110 into engagement when the movement of plunger 62 for the effecting of a speed change has caused fluid to be supplied to the channel 134 from the valve 127, and to disengage clutch 110 when the rate change is completed. The device 148 is supplied with fluid through a pipe or channel 149, but only when the piston 137 of the device 135 is in its central position, that is to say, after the clutch 12 and brake 13 have both been disengaged. Device 148 consists of a cylinder 150 in which a piston 151 is fitted and projects therefrom in a manner for a shoe or element 152, Fig. 3, to be pressed against the end of the shaft 109, whereby to move the shaft axially in a direction to cause engagement of the friction elements of the clutch 110. Normally the piston 151 is pressed in the opposite direction by a spring 153, but when fluid under pressure is admitted from pipe 134 through the channel 149, the fluid pressure in cylinder 150 overcomes the spring and causes engagement of the clutch. As previously stated, fluid pressure is available through the channel 149 only when the piston 137 of the device 135 is in its central position, thus providing an interlock preventing engagement of both clutches simultaneously, this effect being obtained by structure as follows: A recess 154 in the piston 137 is of such form and position that it provides communication between the supply port 139 and a port 155 communicating with channel 149 only when the piston 137 is centrally positioned. This provides the desired restriction as to the supply of fluid to the cylinder 150. The fluid supply is further restricted by the fact that irrespective of the position of the piston 137, the channel 134, from which channel 149 must be supplied, contains no fluid under pressure unless the plunger 62 of the rate change device has been moved to effect a rate change. As has been previously explained, the friction surfaces of the clutch 110 are of such form that immediately after pressure has been removed, they will be disengaged and by the mechanism described the clutch 110 is invariably disengaged except when a rate change is to be effected and then only after the clutch 12 and brake 13 have been disengaged.

Fluid may be supplied to the valve 127 through pipe 128 from any suitable source, as previously stated, but in the present instance there is utilized for the source a pump 156, Figs. 5, 6, which is also utilized for the lubrication of the spindle train. The spindle train is housed within the hollow column 1 and there is provided a header 157, Figs. 2 and 5, which sprays fluid over the rotating gears and into suitable channels leading to the various bearings for the lubrication thereof, the fluid being supplied from a reservoir indicated at 158, Fig. 5, through a supply channel 159 to the inlet port of pump 156 from which it passes through a channel or pipe 160 to a filtering device 161 and thence through the channel 128 to the valve 127. In the normal position of the plunger 126, that is to say, except during a shift of the spindle rate changer, the port 130, Fig. 10, of the valve 127 communicates through the recess or groove 129 in the rod 126 to a port or opening 131 from which the fluid is passed to a lubricating supply pipe 132 which terminates in the header 157, previously mentioned. When the rod 126 has been shifted to the position in which the fluid from the supply pipe 128 is directed to the port 133 communicating with the pipe or channel 134, the port 131 is closed by the body of the rod 126 and until the devices 135 and 148, which are supplied with fluid from the channel 134, as previously described, have performed their function, the flow of fluid to the lubricating system is substantially interrupted. However, immediately after the devices 135 and 148 have operated, fluid is no longer withdrawn to the channel 134 but is then passed instead through a channel 158 and a pressure regulating or limiting device generally denoted by numeral 159 and then again supplies the lubricating channel 132 with fluid. The pressure regulating device 159 consists of a spring pressed ball 160 adapted to close channel 158, except when the pressure therein rises above the pressure of a spring 161 and also adapted to prevent fluid from reaching the channel 134 from the port 131 or pipe 132. Thus even during the interval when a rate change is being effected and except for the fluid necessary to supply the devices 135 and 148, the lubricating channel 132 receives the full supply of fluid from the pump 156, yet such fluid is always available at the proper time for the supply of the channel 134.

Having now revealed the invention, what is claimed is:

1. In a machine tool, the combination of a transmission including an adjustable rate changer, a substantially constant speed power source, a plurality of power trains respectively for connecting said source to drive said rate changer at a normal operating rate and a relatively slow rate; and control mechanism for said transmission including means for adjusting said rate changer and having an operative and an inoperative position, means shiftable for effecting said slow rate of the one or the other of said normal and relatively slow rates, and means connected to be moved upon movement of said adjusting means to operative position and operative for shifting said shiftable means to effect said relatively slow rate during rate changer adjustment.

2. In a milling machine, the combination of a rotatable tool spindle, a transmission therefor including a rate changer comprising a plurality of elements adjustable into a variety of element combinations each productive of different spindle speeds, a plurality of trains respectively for driving said rate changer at a normal operating rate and a relatively slow rate; and control mechanism for said transmission including means for adjusting said rate changer and having an operative and an inoperative position, means shiftable for connecting said relatively slow driving train, and means connected to be moved upon movement of said adjusting means to operative position and operative for effecting said connection of the relatively slow driving train.

3. In a machine tool, the combination of a transmission including an adjustable rate changer, means for driving said rate changer including a plurality of power trains respectively operative at a normal rate and a relatively slow rate; and control mechanism for said transmission including a power operable device for connecting said relatively slow rate driving train, a power connection for said device, a member shiftable to a plurality of positions during adjustment of said rate changer, and means connected to be moved upon movement of said adjusting means to one of said positions and operative to control said power operable device.

4. In a machine tool, the combination of a transmission including an adjustable rate changer, a plurality of trains respectively for driving said rate changer at a normal rate and a relatively slow rate; and control means for said transmission including a fluid operable shifter for connecting said relatively slow rate driving train, a source of fluid supply connectible for operation of said shifter, a valve controlling operation of said shifter from said fluid supply source, a member shiftable during adjustment of said rate changer, and a motion transmitting connection from said member to shift said valve during rate changer adjustment to a position effecting said slow rate.

5. In a machine tool, the combination of a transmission including an adjustable rate changer, a plurality of trans respectively for driving said rate changer at a normal speed and a relatively slow speed; and control mechanism for said transmission including adjusting means for said rate changer, locking means adapted to selectively retain said rate changer in different positions of adjustment thereof and including a member shiftable for unlocking said means, a shifter device for connecting the relatively slow rate driving train, and a motion transmitting connection from said member to said shifter device for operation thereof to effect said slow rate during rate changer adjustment.

6. In a machine tool, the combination of a transmission including an adjustable rate changer, a plurality of trains respectively for driving said rate changer at a normal speed and a relatively slow speed; and control mechanism for said transmission including adjusting means for said rate changer, locking means adapted to selectively retain said rate changer in different positions of adjustment thereof and including a member shiftable for unlocking said means, a fluid operable shifter device for connecting said slow rate driving train, a source of fluid supply connectible with said device, valve means controlling the supply of fluid from said source to said device, and a motion transmitting connection from said member to shift said valve means during rate changer adjustment to a position effecting said slow rate.

7. In a machine tool, the combination of a transmission including an adjustable rate changer, a plurality of trains respectively for driving said rate changer at a normal speed and a relatively slow speed; and control mechanism for said transmission including adjusting means for said rate changer, locking means adapted to selectively retain said rate changer in different positions of adjustment thereof and including a member shiftable for unlocking said means, a lubricating system for said transmission including a pump and a reservoir, a fluid operable shifter device for connecting said slow driving train, valve means adapted to connect said pump for operation of said shifter device, and a motion transmitting connection from said member to shift said valve means to effect said slow rate during rate changer adjustment.

8. In a machine tool, the combination of a transmission including an adjustable rate changer, a plurality of alternative drives for said rate changer including a normally speeded drive providing motion interrupting means and a relatively slow speed drive providing a drive connecting means and an overrunning device, and means for substantially simultaneously operating said motion interrupting means and said drive connecting means.

9. In a machine tool, the combination of a transmission including an adjustable rate changer, drive means therefor including a driving clutch and a brake, means shiftable to selectively connectl said rate changer with said clutch or with said brake or to disconnect said rate changer from both said clutch and said brake, means for shifting said shiftable means, adjusting means for said rate changer, and means operative in accordance with said adjusting means for the operation of said shiftable means.

10. In a machine tool having a tool support and a work support, the combination of a transmission for movement of one of said supports including a rate changer adjustable for a series of predetermined rates including a high rate, a low rate and a variety of intermediate rates, a substantially constant speed power train operative to drive said rate changer at a normal rate productive of said predetermined rates, a device operable for alternatively establishing or interrupting said drive, a relatively slow speed train connectible to drive said rate changer, means for connecting said slow speed train, and control mechanism for said transmission including a chart having indices respectively corresponding to different of said rates, indicating means movable relative to said chart, means for adjusting said rate changer to different positions respectively selective of one or another of said rates, a connection operative for relative adjustment of said chart and indicating means in accordance with movement of said rate changer adjusting means, means for operation of said device, and means operatively connecting said device operating means, said rate changer adjusting means and said means for connecting said slow train to prevent adjustment of the rate changer while said device is operative to establish said drive and to prevent adjustment of said rate changer except during connection of said slow train.

11. In a machine tool, the combination of a transmission including an adjustable rate changer, a power source, a brake, a normal speed train including an element shiftable to alternatively connect said power source or said brake to said rate changer and having an intermediate position disconnecting both said power source and said brake, a relatively slow train connectible to drive said rate changer, adjusting means for said rate changer, a device for substantially simultaneously shifting said element to said intermediate position and connecting said slow train to drive said rate changer, and means operative from said rate changer adjusting means to operate said device for connecting said slow train during rate changer adjustment.

12. In a machine tool having a power transmission mechanism including an adjustable rate changer, the combination with a clutch engageable to effect driving of said mechanism and a brake engageable to stop said mechanism, of means arranged to adjust said rate changer, and means associated with said adjusting means and operative thereby in manner to automatically disengage both said clutch and said brake upon movement of said adjusting means in initiating adjustment of said rate changer.

13. In a machine tool having a transmission mechanism including an adjustable rate changer, driving means for said rate changer including a disconnecting clutch, a brake associated with said rate changer for stopping it, adjusting means for said rate changer, and power actuated means responsive to movement of said rate changer adjusting means and operative to disconnect said clutch and to disengage said brake when said adjusting means is moved in adjusting said rate changer, thereby facilitating said adjustment.

14. In a machine tool having a speed changing power transmission mechanism including shiftable gearing, driving means for said transmission mechanism including a power source and a selectively engageable clutch arranged to operatively connect said power source to said mechanism, a lubricating system for said transmission mechanism, a lubricating pump connected to furnish oil under pressure to said lubricating system, hydraulically actuated means arranged to be operated by oil under pressure from said lubricating pump and effective to disengage said clutch, means arranged to shift said gearing, a hydraulic control valve operative in response to a shifting movement of said gear shifting means to close the connection from said pump to said lubricating system and to admit oil under pressure from said pump into said hydraulically actuated clutch disengaging means for effecting disengagement of said clutch prior to shifting of said gearing, and pressure limiting means arranged to relieve the pressure of said actuating oil in said hydraulically actuated means when it exceeds a predetermined maximum and to permit excess oil therefrom to flow into said lubricating system.

15. In a machine tool having a speed changing power transmission mechanism including shiftable gearing, driving means for said transmission mechanism including a power source and a selectively engageable clutch arranged to operatively connect said power source to said mechanism, means actuated by said power source and operative to disengage said clutch, an auxiliary drive apparatus arranged to alternatively drive said mechanism from said power source at a low rate of speed to facilitate shifting of said gearing when said clutch is disengaged, means operative to shift said gearing, and control means operative by said gear shifting means in response to a shifting movement thereof to control said power actuated clutch disengaging means in manner to effect disengagement of said clutch prior to shifting of said gearing, and to effect slow rotation of said gearing by said auxiliary drive apparatus during shifting thereof.

16. In a machine tool having an adjustable power transmission mechanism including a rate changer, the combination with a clutch engageable to effect driving of said mechanism and a brake engageable to stop said mechanism, of means arranged to adjust said rate changer, means associated with said adjusting means and operative thereby in manner to automatically disengage both said clutch and said brake upon movement of said adjusting means in adjusting said rate changer, and an auxiliary drive apparatus arranged to drive said mechanism at low rate of speed when said clutch and said brake are disengaged, whereby adjustment of said rate changer is facilitated.

17. In a machine tool having an adjustable rate changing power transmission mechanism including shiftable gearing, the combination with a main driving means including a main clutch engageable to drive said mechanism at normal operating speed, of an auxiliary slow speed driving means including an overrunning clutch device operatively connected in manner to drive said mechanism at low rate of speed to facilitate shifting of said gearing when said main clutch is disengaged.

18. In a machine tool having a prime mover, a spindle, and a variable speed transmission connected to the spindle, the combination of a clutch for coupling the transmission to the prime mover for actuation thereby, a brake operable by the clutch on disengagement thereof for stopping the transmission, a branch train coupled to the prime mover exclusive of the clutch, means to connect the train for slow rotation of the transmission during disengagement of the clutch, and means automatically operable upon connection of said train to release the brake.

19. A machine tool having a spindle, a variable speed shiftable gear transmission therefor, a prime mover, a main clutch for coupling the prime mover to the transmission, a branch transmission continuously actuated by the prime mover, an auxiliary clutch for coupling the branch transmission to the spindle transmission when the main clutch is uncoupled for effecting slow rotation thereof during shifting of its gears, and an interlock between the main clutch and the auxiliary clutch to prevent engagement of the main clutch when the auxiliary clutch is effective.

20. In a machine tool having a transmission including an adjustable rate changer, the combination with driving means including a main clutch engageable to drive said adjustable rate changer at normal operating speed, of an auxiliary driving device including a speed reducing train and an auxiliary clutch operative when said main clutch is disengaged to drive said rate changer at a low rate of speed in manner to facilitate adjustment thereof.

21. In a machine tool having an adjustable rate changer including shiftable gearing, the combination with main driving means including a clutch engageable to drive said gearing at normal operating speed, of an auxiliary slow speed driving means arranged to function when said main clutch is disengaged and operative to drive said gearing at a predetermined low rate of speed to facilitate gear shifting.

22. In a machine tool having an adjustable transmission mechanism including shiftable gearing, driving means for said mechanism including a main clutch, a brake disposed to stop said mechanism, an auxiliary drive apparatus arranged to drive said mechanism at a low rate of speed to facilitate shifting of said gearing, a single control element arranged to effect shifting of said gearing, and means associated with said gear shifting control element for actuating both said main clutch and said brake to disengage them prior to a shifting operation and for engaging said auxiliary drive apparatus to cause said gearing to turn slowly while being shifted.

23. In a speed changing power transmission mechanism including shiftable gearing, a source of power for driving said mechanism, primary means disposed to selectively connect said source of power to said mechanism to drive it, means for shifting said gearing, and an auxiliary speed reducing drive apparatus disposed to selectively connect said source of power to said mechanism to actuate it at a low rate of speed when said primary means is disconnected to thereby rotate said shiftable gearing in manner facilitating shifting thereof.

24. In a speed changing power transmission mechanism including shiftable gearing, a source of power for driving said mechanism, a main clutch disposed to selectively connect said source of power to said mechanism to drive it, means for shifting said gearing, an auxiliary speed reducing drive apparatus disposed to selectively connect said source of power to said mechanism to actuate it at a low rate of speed when said main clutch is disengaged to thereby rotate said shiftable gearing in manner facilitating shifting thereof, and control means associated with said gear shifting means and operative to automatically disengage said main clutch and connect said auxiliary drive apparatus prior to shifting of said gearing.

25. In a machine tool having an adjustable transmission mechanism including shiftable gearing, driving means for said mechanism including an auxiliary drive apparatus arranged to drive said mechanism at a low rate of speed to facilitate shifting of said gearing, and a single control element arranged to effect shifting of said gearing and operative to engage said auxiliary drive apparatus prior to a shifting operation to cause said gearing to turn slowly while being shifted.

26. In a machine tool, the combination with power transmission means including a shiftable member operative to adjust the driving effect produced thereby, of primary driving means connectible to apply power to said transmission means to drive it at normal operating speed, an auxiliary slow speed driving mechanism, means operative to disconnect said primary driving means from said transmission means, and other means operative to connect said auxiliary slow speed driving mechanism to said transmission means in lieu of said primary driving means, whereby said transmission means may be actuated slowly to facilitate shifting of said shiftable member in executing a change in the driving effect thereof.

27. In a machine tool the combination of a transmission including in the order recited a constant speed power source, a shiftable interrupter clutch device and a rate changer, said rate changer including a plurality of rate change devices serially arranged and shiftable to a variety of position combinations respectively for different predetermined output speeds, speed selector means including a chart having numerical markings respectively corresponding in value to different of said speeds and indicator means movable relative to said chart, shifter means for said clutch device, shifter means for said rate change devices, shifter means for said relative chart and indicator movement, a controller combinedly operatively controlling each of said shifter means, and another controller individually operatively controlling said clutch device to alternatively interrupt or establish the driving connection of said power source and rate changer.

28. In a machine tool the combination of a transmission including in the order recited a constant speed power source, a clutch device and a rate changer, said clutch device being shiftable to alter the driving connection of said source to said rate changer, said rate changer including a plurality of rate change devices serially arranged and shiftable to a variety of position combinations respectively for different predetermined output speeds, speed selector means including a chart having numerical markings respectively corresponding in value to different of said speeds and indicator means movable relative to said chart, shifter means for said rate change devices, shifter means for said relative chart and indicator movement, a power operable shifter for said clutch device, and a controller combinedly operatively controlling said rate change shifter, said chart and indicator shifter and the power operation of said clutch device shifter, whereby to effect said alteration of driving connection during rate change.

29. In a machine tool the combination of a transmission including in the order recited a constant speed power source, a shiftable interrupter clutch device and a rate changer, said rate changer including a plurality of rate change devices serially arranged and shiftable to a variety of position combinations respectively for different predetermined output speeds, speed selector means including a chart having numerical markings respectively corresponding in value to different of said speeds and indicator means movable relative to said chart, shifter means for said rate change devices, shifter means for said relative chart and indicator movement, a power operable shifter for said clutch device, a controller combinedly operatively controlling said rate change shifter, said chart and indicator shifter and the power operation of said clutch device shifter, and another controller individually operable for shifting said clutch device to alternatively interrupt or establish the driving connection of said power source and rate changer.

30. In a machine tool the combination of a transmission including in the order recited a constant speed power source, a shiftable interrupter clutch device and a rate changer, said rate changer including a plurality of rate change devices serially arranged and shiftable to a variety of position combinations respectively for different predetermined output speeds, speed selector means including a chart having numerical markings respectively corresponding in value to different of said speeds and indicator means movable relative to said chart in accordance with the shifting of said rate change devices, shifter means for said clutch device, shifter means for said rate change devices, a controller combinedly operatively controlling both said shifters to shift said clutch shifter in advance of the other shifter, and another controller individually operatively controlling said clutch device to alternatively interrupt or establish the driving connection of said power source and rate changer.

31. In a machine tool the combination of a transmission including in the order recited a constant speed power source, a clutch device and a rate changer, said clutch device being shiftable to alter the driving connection of said source and rate changer, said rate changer including a plurality of rate change devices serially arranged and shiftable to a variety of position combinations respectively for different predetermined output speeds, speed selector means including a chart having numerical markings respectively corresponding in value to different of said speeds and indicator means movable relative to said chart in accordance with the shifting of said rate change devices, shifter means for said rate change devices, power operable shifter means for said clutch device, and a controller combinedly operatively controlling said rate change shifter and the power connection of said clutch shifter whereby to effect said alteration of driving connection during rate change.

32. In a machine tool the combination of a transmission including in the order recited a constant speed power source, a shiftable interrupter clutch device and a rate changer, said rate changer including a plurality of rate change devices serially arranged and shiftable to a variety of position combinations respectively for different predetermined output speeds, speed selector means including a chart having numerical markings respectively corresponding in value to different of said speeds and indicator means movable relative to said chart in accordance with the shifting of said rate change devices, shifter means for said rate change devices, power operable shifter means for said clutch device, a controller combinedly operatively controlling said rate change shifter and the power connection of said clutch shifter, and another controller individually operatively controlling said clutch device to alternatively interrupt or establish the driving connection of said power source and rate changer.

33. In a machine tool the combination of a transmission including in the order recited a constant speed power source, a shiftable clutch device and a rate changer, said rate changer including a plurality of rate change devices serially arranged and shiftable to a variety of position combinations respectively for different predetermined output speeds, said transmission also including shiftable brake means effective on some of said rate change devices, speed selector means including a chart having numerical markings respectively corresponding in value to different of said speeds and indicator means movable relative to said chart, shifter means for said clutch device, shifter means for said speed change devices, shifter means for said relative indicator movement, shifter means for said brake, a controller combinedly controlling the shifter means for said speed change devices, said relative movement and said clutch, and another controller independently operable for the control of the shifter means for said clutch and said brake.

34. In a machine tool the combination of a transmission including in the order recited a power source, shiftable interrupter means and a rate changer, said rate changer including a plurality of rate change devices shiftable to a variety of position combinations respectively effecting different transmission speed ratios, said interrupter means having an interrupting position and a driving position effective for a normal speed drive of said rate changer from said power source, means for alternatively effecting a relatively low speed drive of said rate changer, selector means including a chart having markings respectively corresponding to different of said speed ratios and an indicator movable relative to said chart, control means for operation of said interrupter means, said rate change devices and said low speed drive means to shift said rate change devices to effect a speed ratio position combination indicated by said selector means during driving of said rate changer at said relatively low speed, and control means for shifting said interrupter means alternatively to interrupting or to said normal speed driving positions without the shifting of said rate change devices.

35. In a machine tool including a transmission comprising a plurality of rate changer devices shiftable for effecting various position combinations respectively for different transmission speed ratios and including a normal speed drive means for said rate change devices comprising a shiftable clutch, the combination of means for alternatively effecting a relatively low speed drive of said rate change devices, control means for operation of said clutch, said rate change devices and said low speed drive means to effect shifting of said devices for a change in transmission ratio while the rate change devices are driven at said relatively low speed, and control means for shifting said clutch independently of the shifting of said rate change devices.

36. In a machine tool the combination of a transmission including a rate changer comprising a plurality of rate change devices shiftable to a variety of position combinations respectively effecting different transmission speed ratios, means for alternative drive of said rate changer at normal or relatively slow rates including a shiftable clutch, control means for effecting shifting of said clutch accompanied by a shifting of said rate change devices while said rate changer is driven at said relatively slow rate, and control means for shifting said clutch independently of the shifting of said rate change devices.

37. In a machine tool the combination of a transmission including a rate changer comprising rate change devices shiftable to a variety of position combinations respectively effecting different transmission speed ratios, means for alternatve drive of said rate changer at normal or relatively slow rates, said drive means being adopted for interruption of the drive, control means for effecting said relatively slow rate simultaneously with the shifting of said rate change devices, and control means operable independently of the shifting of said rate change devices for alternatively effecting said normal rate or effecting said interruption.

38. In a machine tool the combination of a transmission including a rate changer comprising rate change devices shiftable to a variety of position combinations respectively effecting different transmission speed ratios, a speed ratio selector including relatively movable chart and indicator means, means for alternative drive of said rate changer at normal or relatively slow rates and adopted for interruption of the drive, control means for effecting said relatively slow rate simultaneously with the shifting of said devices to effect a speed ratio indicated on said selector means, and control means for independently alternatively effecting said normal speed drive or effecting the interruption of the drive.

39. In a machine tool the combination of a transmission including a rate changer comprising rate change devices shiftable to a variety of position combinations respectively effecting different transmission speed ratios, a speed ratio selector including relatively movable chart and indicator means, means for alternative drive of said rate changer at normal or relatively slow rates and adopted for interruption of the drive, a brake shiftable to alternatively restrain or release at least a portion of said rate changer, control means for effecting said relatively slow drive during the release position of said brake and simultaneously with the shifting of said devices to effect the speed ratio indicated by said selector means, and control means for alternatively effecting said normal speed drive or effecting the interruption of the drive of said rate changer during the restraining position of said brake and independently of the shifting of said devices.

40. In a machine tool having a power transmission including an adjustable rate changer, the combination with a clutch engageable to effect driving of said rate changer and a brake engageable to retard said drive, of means arranged to adjust said rate changer, means associated with said adjusting means for automatically disengaging both said clutch and said brake to facilitate the rate changer adjustment, and control means for operation of said clutch and brake independently of said adjusting means.

41. In a machine tool, the combination of a transmission including an adjustable rate changer, drive means therefor including a driving clutch and a brake, means shiftable to selectively connect said rate changer with said clutch or with said brake or to disconnect said rate changer from both said clutch and said brake, means for shifting said shiftable means including a power train, adjusting means for said rate changer, and means associated with said adjusting means and controlling said power train for effecting disengagement of both said clutch and said brake to facilitate the rate changer adjustment.

42. In a machine tool the combination of a transmission including in the order recited a constant speed power source, a clutch device and a rate changer, said clutch device being shiftable to alter the driving connection of said source and rate changer, said rate changer including a plurality of rate changer devices serially arranged and shiftable to a variety of position combinations respectively for different output speeds, speed selector means including a chart having numerical markings respectively corresponding in value to different of said speeds and indicator means movable relative to the chart, shifter means for said rate change devices, power operable shifter means for said clutch device, and control means including means combinedly operatively controlling said rate change shifter and the power connection of said clutch shifter and means for independent control of said clutch for alternative engagement or disengagement thereof.

43. In a machine tool the combination of a transmission including in the order recited a power source, a brake device, and a rate changer, said brake device being shiftable to alternative engaged and disengaged positions, said rate changer including a plurality of rate change devices serially arranged and shiftable to a variety of position combinations respectively for different output speeds, speed selector means including a chart having numerical markings respectively corresponding in value to different of said speeds and indicator means movable relative to said chart, shifter means for said rate change devices, shifter means for said brake, and control means combinedly controlling said shifters whereby to effect a disengaged position of said brake during rate change.

44. In a machine tool the combination of a transmission including in the order recited a power source, a brake device, and a rate changer, said brake device being shiftable to alternative engaged and disengaged positions, said rate changer including a plurality of rate change devices serially arranged and shiftable to a variety of position combinations respectively for different output speeds, speed selector means including a chart having numerical markings respectively corresponding in value to different of said speeds and indicator means movable relative to said chart, shifter means for said rate change devices, shifter means for said brake, control means combinedly controlling said shifters whereby to effect a disengaged position of said brake during rate change, and means for independent control of said brake shifter means for effecting said alternative engaged or disengaged positions of the brake.

45. In a machine tool the combination of a transmission including an adjustable rate changer, driving means for said rate changer including a clutch shiftable to alternative driving and interrupting positions, adjusting means for said rate changer including a member alternatively positionable to render said adjusting means operable or inoperable, and means for shifting said clutch to interrupting position during the positioning of said member for rendering said adjusting means operable.

46. In a machine tool the combination of a transmission including an adjustable rate changer, driving means for said rate changer including a clutch shiftable to alternative driving and interrupting positions, adjusting means for said rate changer including a member alternatively positionable to render said adjusting means operable or inoperable, means for shifting said clutch to interrupting position during the positioning of said member for rendering said adjusting means operable, and means for shifting said clutch independently of said adjusting means.

47. In a machine tool the combination of a transmission including in the order recited a power source, a clutch alternatively shiftable to driving and interrupting positions, and a rate changer including a plurality of rate change devices serially arranged and adjustable to a variety of position combinations respectively for different output speeds, speed selector means including a chart having numerical markings respectively corresponding in value to different of said speeds and indicator means movable relative to said chart, adjusting means for said rate changer including a member alternatively positionable to render said adjusting means operable or inoperable, and means preventing said clutch from occupying said driving position when said member is positioned for rendering said adjusting means operable.

48. In a machine tool the combination of a transmission including in the order recited a power source, a clutch alternatively shiftable to driving and interrupting positions, and a rate changer including a plurality of rate change devices serially arranged and adjustable to a variety of position combinations respectively for different output speeds, speed selector means including a chart having numerical markings respectively corresponding in value to different of said speeds and indicator means movable relative to said chart, adjusting means for said rate changer including a member alternatively positionable to render said adjusting means operable or inoperable, means preventing said clutch from occupying said driving position when said member is positioned for rendering said adjusting means operable, and means for shifting said clutch independently of said adjusting means.

49. In a machine tool having a tool support and a work support the combination of a transmission for relative movement of said support including a rate changer adjustable for a series of predetermined rates, drive means for alternatively actuating said rate changer at normal or relatively slow rates, said drive means being operable to interrupting the rate changer drive, and control means for said transmission including means for adjusting said rate changer to effect one or another of said predetermined rates, means interoperative with said adjusting means to effect said relatively slow drive rate during operation of said adjusting means, and means independently controlling said drive means to alternatively effect said normal rate or the interruption of the rate changer device.

WALTER M. POHL.
JOSEPH B. ARMITAGE.